United States Patent
Koran

(10) Patent No.: US 9,105,049 B2
(45) Date of Patent: Aug. 11, 2015

(54) SYSTEM AND METHOD FOR AUTOMATICALLY DETERMINING AN ADVERTISEMENT TYPE OF A DIGITAL ADVERTISEMENT

(75) Inventor: Joshua M. Koran, Mountain View, CA (US)

(73) Assignee: Yahoo! Inc., Sunnydale, CA (US)

( * ) Notice: Subject to any disclaimer, the term of this patent is extended or adjusted under 35 U.S.C. 154(b) by 2454 days.

(21) Appl. No.: 11/701,330

(22) Filed: Jan. 31, 2007

(65) Prior Publication Data
US 2008/0183558 A1    Jul. 31, 2008

(51) Int. Cl.
G06Q 30/00    (2012.01)
G06Q 30/02    (2012.01)

(52) U.S. Cl.
CPC ............ G06Q 30/0256 (2013.01); G06Q 30/02 (2013.01); G06Q 30/0269 (2013.01)

(58) Field of Classification Search
CPC ..................................................... G06Q 30/00
USPC ............. 705/14, 14.73; 707/5, 104.1; 725/32, 725/34; 715/719
See application file for complete search history.

(56) References Cited

U.S. PATENT DOCUMENTS

| | | | |
|---|---|---|---|
| 7,136,871 B2 * | 11/2006 | Ozer et al. | 1/1 |
| 2001/0029465 A1 * | 10/2001 | Strisower | 705/14 |
| 2002/0083441 A1 * | 6/2002 | Flickinger et al. | 725/32 |
| 2007/0027865 A1 * | 2/2007 | Bartz et al. | 707/5 |
| 2007/0079326 A1 * | 4/2007 | Datta et al. | 725/34 |
| 2007/0150353 A1 * | 6/2007 | Krassner et al. | 705/14 |
| 2008/0065990 A1 * | 3/2008 | Harrison et al. | 715/719 |
| 2008/0126193 A1 * | 5/2008 | Robinson | 705/14 |
| 2009/0106100 A1 * | 4/2009 | Mashinsky | 705/14 |

* cited by examiner

*Primary Examiner* — John G Weiss
*Assistant Examiner* — Marilyn G Macasiano
(74) *Attorney, Agent, or Firm* — Brinks Gilson & Lione

(57) ABSTRACT

Systems and methods for determining a type of a digital ad are disclosed. Generally, an ad type determination module automatically determines a type of a digital ad, such as a direct response ad or a branding ad, based on at least one of (1) a number of hyperlinks associated with the digital ad, (2) a number of click throughs associated with the digital ad, (3) a click-through rate associated with the digital ad, and (4) an industry associated with the digital ad. After the ad type determination module determines a type of the digital ad, an indication of the type of digital ad may be exported to a system of an online advertisement service provider so that the online advertisement service provider may perform actions such as optimizing the digital ad, or generating reports regarding the digital ad, based on the determined type of the digital ad.

25 Claims, 3 Drawing Sheets

SYSTEM AND METHOD FOR AUTOMATICALLY DETERMINING AN ADVERTISEMENT TYPE OF A DIGITAL ADVERTISEMENT

BACKGROUND

Advertisers advertising with online advertisement service providers ("ad providers") such as Yahoo! often create different digital ads to implement different advertising strategies. For example, an advertiser may create a digital ad, typically known as a direct response ad, to drive traffic to a particular webpage by directing users that click on a digital ad to a particular webpage. Alternatively, an advertiser may create a digital ad, typically known as a branding ad, to promote a specific product or specific brand of products by placing the digital ad prominently on a webpage to increase product awareness.

When interacting with an ad campaign management system of a digital ad provider to create digital ads, advertisers typically do not indicate an advertisement type of a digital ad. Therefore, it is often difficult for ad providers to optimize digital ads, or to prepare accurate reports on digital ads, because the ad provider does not know what type of advertising strategy the digital ad is implementing. For example, an ad provider should not necessarily optimize a branding ad to increase a click-through rate associated with the digital ad. An advertiser may have set impression parameters or business objectives associated with a branding ad to have the ad placed in prominent positions in a webpage rather than to obtain a high click-through rate.

Similarly, reports prepared by ad providers that compare the click-through rates of a branding ad to a direct response ad may not be helpful to advertisers. Branding ads and direct response ads are typically associated with different performance metrics and budget parameters due to the fact advertisers optimize branding ads to have prominent positions in webpages regardless of a click-through rate where advertisers optimize direct response ads to optimize performance metrics such as click-through rates to efficiently drive traffic to a webpage based on budget constraints. Reports prepared by ad providers that compare one direct response ad to another direct response ad, or compare one branding ad to another digital ad would be more helpful to advertisers.

Currently, ad providers may employ human editors to review digital ads and make a determination of whether the digital ad is a direct response ad, a branding ad, or some other type of digital ad. Having human editors review digital ads to make a determination of the type of a digital ad is expensive, time consuming, and inefficient. Therefore, improved systems and methods for automatically determining an advertisement type of a digital ad are desirable.

DETAILED DESCRIPTION OF THE DRAWINGS

The present disclosure is directed to systems and methods for automatically determining an advertisement type of a digital ad. Automatically determining an advertisement type of a digital ad provides an ad provider the ability to quickly and accurately determine an advertisement type of a digital ad with a reduced number of human editors. The ability to quickly and accurately determine an advertisement type of a digital ad provides the ability to create more accurate reports for advertisers and the ability to better optimize digital ads based on an advertising strategy of an advertiser.

Figure 1:
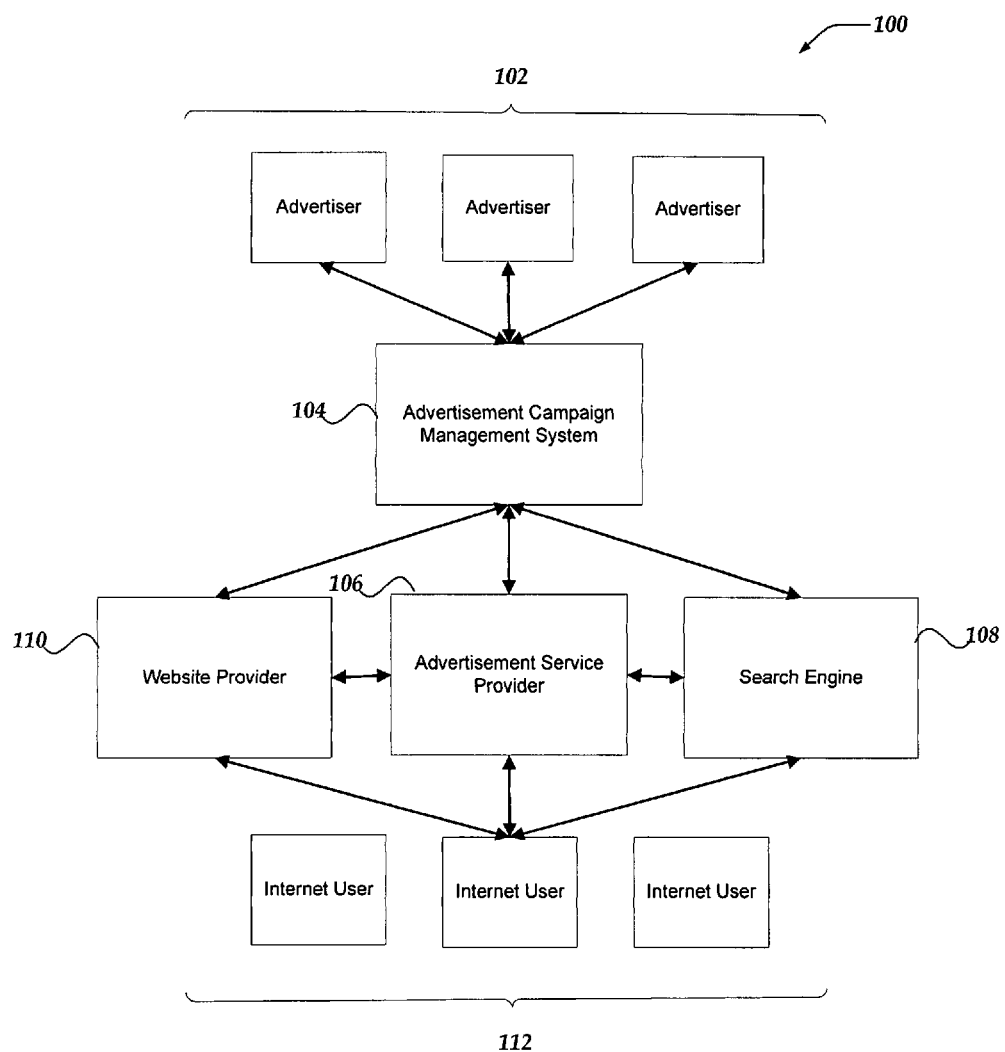
FIG. 1 is a block diagram of one embodiment of an environment in which systems and methods for automatically determining an advertisement type of a digital ad may operate.

FIG. 1 is a block diagram of one embodiment of an environment in which a system for automatically determining an advertisement type of a digital ad may operate. However, it should be appreciated that the systems and methods described below are not limited to use with a search engine or pay-for-placement online advertising. The environment 100 includes a plurality of advertisers 102, an ad campaign management system 104, an ad provider 106, a search engine 108, a website provider 110, and a plurality of Internet users 112. Generally, an advertiser 102 bids on terms and creates one or more digital ads by interacting with the ad campaign management system 104 in communication with the ad provider 106. The advertisers 102 may purchase digital ads based on an auction model of buying ad space or a guarantied delivery model by which an advertiser pays a minimum cost-per-thousand impressions (i.e. CPM) to display the digital ad. Typically, the advertisers 102 may pay additional premiums for certain targeting options, such as targeting by demographics, geography, technographics or context. The digital ad may be a graphical banner ad that appears on a website viewed by Internet users 112, a sponsored search listing that is served to an Internet user 108 in response to a search performed at a search engine, a video ad, a graphical banner ad based on a sponsored search listing, and/or any other type of online marketing media known in the art.

When an Internet user 112 performs a search at a search engine 108, the ad provider 106 serves one or more digital ad created using the ad campaign management system 104 to the Internet user 112 based on search terms provided by the Internet user 112. Similarly, when an Internet user 112 views a website served by the website provider 110, the ad provider 106 serves one or more digital ads to the Internet user 112 based on keywords obtained from a website. Additionally, the ad campaign management system 104 and the ad provider 106 typically record and process information associated with the served digital ads for purposes such as billing, reporting, or ad campaign optimization. For example, the ad campaign management system 104 and ad provider 106 may record the search terms that caused the ad provider 106 to serve the digital ads; whether the Internet user 112 clicked on a URL associated with the served digital ads; what additional digital ads the ad provider 106 served with the digital ad; a rank or position of a digital ad when the Internet user 112 clicked on the digital ad; or whether an Internet user 112 clicked on a URL associated with a different digital ad. One example of an ad campaign management system that may perform these types of actions is disclosed in U.S. patent application Ser. No. 11/413,514, filed Apr. 28, 2006, and assigned to Yahoo! Inc.

As described in more detail below, systems of the ad provider 106 may utilize an ad type determination module to determine an advertisement type of a digital ad so that the ad provider 106 may optimize digitals ads based on an advertising strategy associated with the digital ad, and the ad provider 106 may create reports comparing the performance of a digital ad with other digital ads of the same advertisement type.

Figure 2:
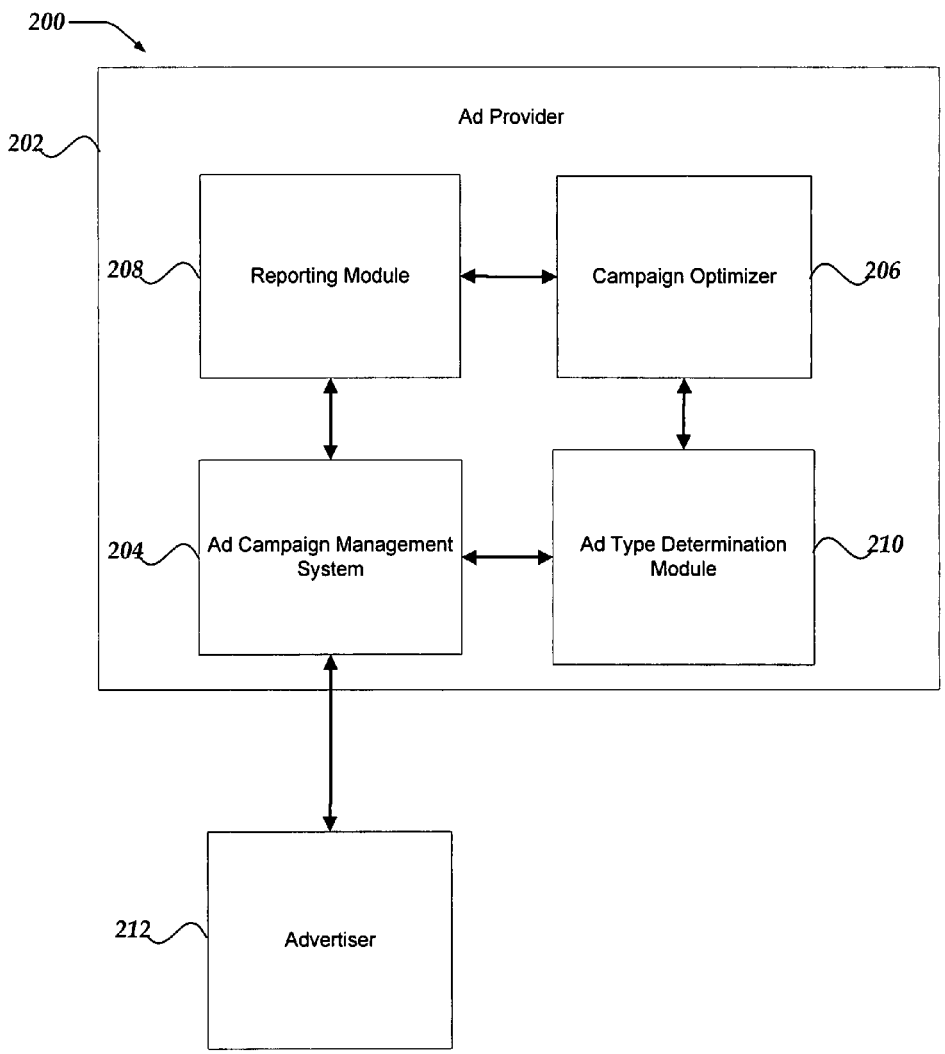
FIG. 2 is a block diagram of one embodiment of a system for automatically determining an advertisement type of a digital ad.

FIG. 2 is a block diagram of one embodiment of a system for automatically determining an advertisement type of a digital ad. The system 200 may include an ad provider 202, an ad campaign management system 204, a campaign optimizer 206, a reporting module 208, and an ad type determination module 210. In some embodiments, the ad campaign management system 204, campaign optimizer 206, reporting module 208, and ad type determination module 210 may be part of the ad provider 202, as shown in FIG. 2. However, in other embodiments, one or more of the ad campaign management system 204, campaign optimizer 206, reporting module 208, and ad type determination module 210 may be separate from the ad provider 202. Typically, the ad provider 202, ad campaign management system 204, campaign optimizer 206, reporting module 208, and ad type determination module 210 communicate with one another over one or more external or internal networks. The ad provider 202, ad campaign management system 204, campaign optimizer 206, reporting module 208, and ad type determination module 210 may be implemented as software code stored on a computer-readable medium and running in conjunction with a processor such as a personal computer, a single server, a plurality of servers, or any other type of computing device known in the art.

As explained in more detail below, an advertiser using an advertiser system 212 interacts with the ad campaign management system 204 to create a digital ad such as a graphical banner ad or a sponsored search listing. After the advertiser creates the digital ad and/or periodically after the ad provider 202 serves the digital ad, the ad type determination module 210 examines the digital ad and performance metrics associated with the digital ad to determine an advertisement type of the digital ad. An advertisement type is a category of advertisement defined by an ad provider that is typically associated with a particular advertising strategy. For example, an ad provider 202 may define a branding ad, a direct response ad, or any other advertisement type associated with an advertising strategy.

A branding ad is typically a graphical banner ad that an advertiser creates to increase product awareness. For example, an advertiser may create digital ads to promote a specific DVD player, or an advertiser may create digital ads to promote a specific brand, such as all products made by a manufacturer. Advertisers typically set impression amounts or business objectives associated with a branding ad so that the digital ad is displayed prominently on a webpage to increase product awareness, regardless of interaction performance metrics such as click-through rates.

A direct response ad is typically a graphical banner ad or a sponsored search listing that an advertiser creates to efficiently drive users to a webpage. For example, an advertiser may create digital ads to promote a product sold at a particular webpage or to promote a particular webpage in general. For example, an advertiser may create a digital ad promoting the sale of a specific DVD player at XYZ.com and encourage potential customers to click on the digital ad to be directed to XYZ.com. Advertisers typically set bid amounts and business objectives associated with a direct response ad to optimize performance parameters associated with the digital ad such as a click-through rate and to increase a number of potential customers who visit a particular webpage.

The ad type determination module 210 examines information relating to a digital ad to determine an advertisement type of the digital ad after the digital ad is created and/or periodically after the ad provider 202 serves the digital ad. To determine an advertisement type associated with a digital ad, the ad type determination module 210 may examine a number of hyperlinks associated with the digital ad, or one or more performance metrics associated with the digital ad.

Digital ads are typically associated with one or more hyperlinks so that when a user clicks on the digital ad, the user is redirected to a webpage. For example, a digital ad may prompt a user to click on a first portion of a digital ad to find more information about a product, to click on a second portion of the digital ad to find more information about a manufacturer of the product, or to click on a third portion of the digital ad to obtain price information about a product. Generally, digital ads that are associated with multiple hyperlinks are more likely to be direct response ads rather than branding ads because the digital ad is encouraging a potential customer to click on the digital ad to be directed to a webpage. Therefore, the ad type determination module 210 may determine that if the number of hyperlinks associated with a digital ad exceeds a predetermined threshold, the digital ad is a direct response ad. In one implementation, for example, the ad type determination module 210 may determine that a digital ad is a direct response ad if two or more hyperlinks are associated with the digital ad. However, the hyperlink threshold may be any number of hyperlinks.

The ad type determination module 210 may additionally or alternatively examine performance metrics such as click-through rates to determine if a digital ad is a branding ad or a direct response ad. Typically, direct response ads are associated with a higher click-through rate when compared to branding ads due to the fact direct response ads are optimized to encourage users to click on the digital ad to drive potential customers to a webpage. Therefore, the ad type determination module 210 may examine a click-through rate associated with a digital ad to determine if the click-through rate exceeds a predetermined click-through rate threshold. If the click-through rate exceeds the click-through rate threshold, the digital ad is deemed to be a direct response ad. However, if the click-through rate does not exceed the click-through rate threshold, the digital ad is deemed to be a branding ad. The ad type determination module 210 may set the click-through rate threshold at any value that the ad type determination module 210 determines accurately predicts whether a digital ad is a direct response ad or a branding ad.

The ad type determination module 210 may determine the click-through rate threshold for the digital ad based on an industry related to the digital ad, or based on a plurality of industries where advertisers advertise with the ad provider 202. Determining a click-through rate threshold for the digital ad based on an industry related to the digital ad provides a more accurate threshold for determining whether the digital ad is a direct response ad or a branding ad. However, when the ad type determination module 210 is not able to determine an industry associated with the digital ad, the ad type determination module 210 may determine a click-through rate threshold based on a plurality of industries where advertisers advertise with the ad provider 202.

Figure 3:
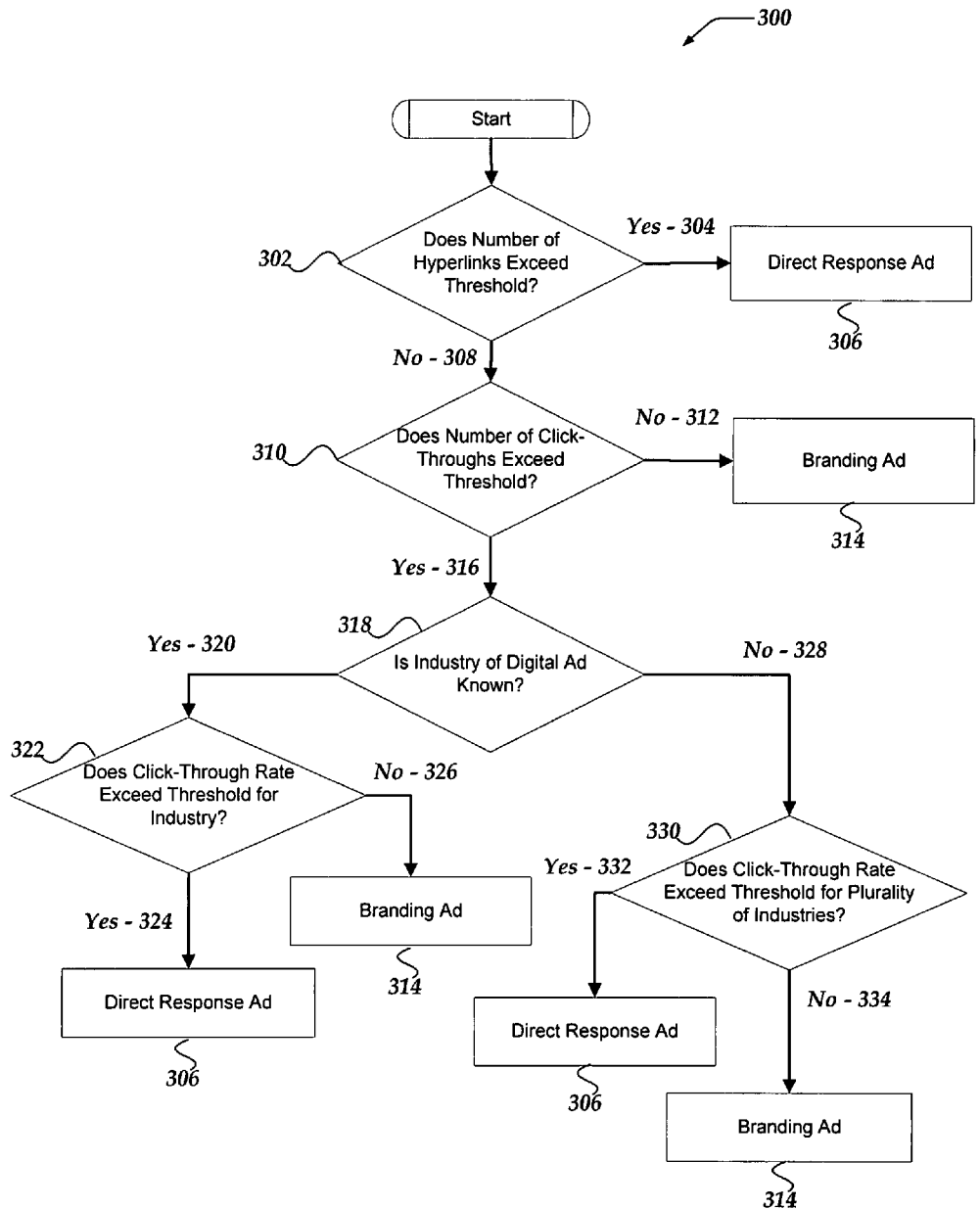
FIG. 3 is a flow chart of one embodiment of a method for automatically determining an advertisement type of a digital ad.

In one embodiment, the ad type determination module 210 determines an ad type of a digital ad by implementing the method of FIG. 3. FIG. 3 is a flow chart of one embodiment of a method for automatically determining an advertisement type of a digital ad. The method 300 begins with the ad type determination module examining a number of hyperlinks associated with a digital ad at step 302 to determine if the number of hyperlinks associated with the digital ad exceeds a hyperlink threshold. In one implementation, the hyperlink threshold is exceeded if two or more hyperlinks are associated with the digital ad. However, an ad provider and/or ad type determination module may set the hyperlink threshold at any number of hyperlinks associated with a digital ad that is indicative of a direct response ad.

If the ad type determination module determines the number of hyperlinks associated with the digital ad exceeds the hyperlink threshold (304), the digital ad is deemed to be a direct response ad at step 306 because the digital ad is likely encouraging users to click on the digital ad to be directed to a webpage.

If the ad type determination module determines the number of hyperlinks associated with the digital ad does not exceed the hyperlink threshold (308), the method proceeds to step 310 where the ad type determination module examines a number of click-throughs associated with the digital ad. More specifically, the ad type determination module may determine whether a number of click-throughs associated with the digital ad exceeds a click threshold. The click threshold is a minimum number of click-throughs associated with the digital ad that the ad provider and/or the ad determination module determine is necessary to accurately predict whether the digital ad is a direct response ad based on a click-through rate associated with the digital ad.

If the ad type determination module determines the number of click-throughs associated with the digital ad does not exceed the click threshold (312), the digital ad is deemed to be a branding ad at step 314 because the low number of click-throughs associated with the digital ad indicate the digital ad is likely a branding ad.

If the ad type determination module determines the number of click-throughs associated with the digital ad exceeds the click threshold (316), the method proceeds to step 318 where the ad type determination module determines if the industry associated with the digital ad is known. In one implementation, the ad type determination module determines if the industry associated with the digital ad is known through the use of services such as Dun & Bradstreet. In another implementation, the industry is manually determined by the advertising service provider and uploaded into the system. In yet other implementations, the ad type determination module determines if the industry associated with the digital ad is known by examining user behavior associated with keywords and digital ads.

If the ad type determination module determines that the industry associated with the digital ad is known (320), the ad type determination module determines whether the digital ad is a direct response ad or a branding ad based on a click-through rate threshold associated with digital ads in the known industry at step 322. More specifically, the ad type determination module determines whether a click-through rate associated with the digital ad exceeds a click-through rate threshold associated with digital ads in the known industry. If the click-through rate exceeds the click-through rate threshold (324), the digital ad is deemed to be a direct response ad at step 306. However, if the click-through rate does not exceed the click-through rate threshold (326), the digital ad is deemed to be a branding ad at step 314.

In some implementations, the click-through rate threshold is determined by setting the click-through rate threshold as an inflection point in graphing a range of click-through rates for the industry or plurality of industries. In one implementation, the ad provider and/or ad determination module may set the click-through rate threshold at a median percentile of click-through rates. For example, the ad provider and/or ad determination module may set the click threshold at 0.16% click-through rate. However, the click-through rate threshold may be set at any value that enables the ad provider and/or ad determination module to accurately predict an advertisement type of a digital ad.

Typically, the ad type determination module only examines click-throughs related to a digital ad to determine an advertisement type of the digital ad after the ad provider had delivered the digital ad a determined number of times (a set number of impressions). When a digital ad is delivered only once, the probability of getting a click-through is low. As the number of impressions of the digital ad increases, the maximum click-through rate associated with the digital ad stabilizes. However, after the ad provider has delivered the digital ad for a length of time, the click-through rate associated with the digital ad decreases. Thus, it is the highest click-through rate after a minimum number of times the ad provider has served the digital ad (a minimum number of impressions) that is typically used to distinguish branding ads from direct-response ads.

In some embodiments, to avoid large changes in a click-through rate associated with a digital ad when the digital ad is created, a Bayesian prior is used. A Bayesian prior provides an ad provider the ability to assume a specific number of impressions and click-throughs for the digital ad when the digital ad is first created. Then as the ad provider serves the digital ad, actual data relating to the number of impression and click-throughs associated with the digital ad is added to the Bayesian prior so that a click-through rate converges to an actual click-through rate associated with the digital ad. For example, when a digital ad is created, an ad provider may associate 100 impressions and one click-through with the digital ad. When the digital ad is served a first time, if an Internet user clicks on the digital ad, a click-through rate is determined based on 101 impressions and two click-throughs. It will be appreciated that if the Bayesian prior were not used in the example described above, when the digital ad is served the first time, a click-through rate would be determined based on one impression and one click-through, resulting in a click-through rate that is not helpful in determining an ad type of a digital ad.

If at step 318, the ad type determination module determines the industry associated with the digital ad is not known (328), the ad type determination module determines whether the digital ad is a direct response ad or a branding ad based on a click-through rate threshold associated with a plurality of industries at step 330. More specifically, the ad type determination module determines whether a click-through rate associated with the digital ad exceeds a click-through rate threshold associated with a plurality of industries. In one implementation, the click-through rate threshold is based on all industries associated with advertisers advertising with an ad provider. However, in other implementations, the click-through rate threshold is based on less than all industries associated with advertisers advertising with an ad provider.

If the ad type determination module determines the click-through rate associated with the digital ad exceeds the click-through rate threshold associated with the plurality of industries (332), the digital ad is deemed to be a direct response ad at step 306. However, if the ad type determination module determines the click-through rate associated with the digital ad does not exceed the click-through rate threshold associated with the plurality of industries (334), the digital ad is deemed to be a branding ad at step 314.

In some implementations, after determining that the digital ad is a direct response ad at step 306 or determining that the digital ad is a branding ad at step 314, the ad type determination module may export an indication of the type of digital ad to systems of an ad provider such as an ad campaign management system and/or a campaign optimizer for optimization of the digital ad. Based on the received indication of the type of digital ad, systems of the ad provider such as the ad campaign management system and/or the campaign optimizer may adjust bids, impressions, targeting or business objectives associated with the digital ad to more effectively implement a desired advertising strategy of an advertiser. For example, if the digital ad is a branding ad, systems of the ad provider such as the ad campaign management system and/or the campaign optimizer may adjust impressions, targeting or business objectives associated with the digital ad so that the ad provider serves the digital ad in more prominent positions in a webpage to more effectively increase awareness of products associated with the digital ad regardless of performance parameters such as click-through rates. Conversely, if the digital ad is a direct response ad, systems of the ad provider such as the ad campaign management system and/or the campaign optimizer may adjust bids, impressions, targeting or business objectives associated with the digital ad so that more users are efficiently directed to one or more webpages associated with the digital ad based on budget constraints. Another system of an ad provider that can benefit from the determination of an ad type and an advertising strategy behind digital ad is a traffic quality system. The traffic quality system attempts to detect non-person or "robot" interactions with digital ads. Since robots are not the targets of advertisers, ad providers credit back to the advertiser any traffic created by robots.

Alternatively or in addition, after determining the digital ad is a direct response ad at step 306 or determining the digital ad is a branding ad at step 314, the ad type determination module may export an indication of the type of digital ad to systems of an ad provider such as an ad campaign management system and/or a reporting module for improved reporting on the digital ad. Based on the received indication of the type of digital ad, systems of the ad provider such as the ad campaign management system and/or the reporting module may aggregate metrics associated with specific types or digital ads or compare the digital ad to other digital ads of the same advertisement type.

For example, systems of the ad provider such as the ad campaign management system and/or the reporting module may aggregate the metrics associated with a plurality of branding ads of an advertiser to better report on the branding ad campaigns of the advertiser. Similarly, systems of the ad provider may aggregate metrics associated with a plurality of direct response ads of an advertiser to better reporting on the direct response ad campaigns of the advertiser. Additionally, to report on the effectiveness of a branding ad, systems of the ad provider may compare the branding ad of an advertiser to branding ads of other advertisers rather than comparing the branding ad to a direct response ad.

It will be appreciated that while some of the methods and systems described above may determine whether a digital ad is a branding ad or direct response digital ad based on click-through rates associated with the digital ad, the same methods and systems may be employed using other performance metrics associated with a digital ad. For example, an ad type determination module may determine whether a digital ad is a branding ad or a direct response ad based on performance metrics such as acquisition rates, purchase rates, search-lift, or any other performance metric associated with a digital ad or one or more groupings of digital ads. Typically, purchase rate is based on a number of potential customers who complete a purchase at a website divided by a number of potential customers that begin a process for completing a purchase at the website. Similarly, an acquisition rate is based on a number of potential users who complete a process, such as performing a specific action at a website such as registering with a website, divided by a number of potential users that begin the process. For the purchase and acquisition rates, the start of the process may be measured from points such as (1) the first interaction with an advertiser's content such as clicking on a digital, (2) upon the arrival of a user at a website, or (3) upon a user visiting a particular webpage on which the user has the opportunity to enter information to begin the process. A search lift is a difference in rates of search activity (i.e. search queries) mentioning an advertiser's brand, product, or company for users exposed to a digital ad of an advertiser compared to users that are not exposed to a digital ad of an advertiser within a particular time window.

FIGS. 1-3 disclose systems and methods for automatically determining an advertisement type of a digital ad. Automatically determining an advertisement type of a digital ad provides an ad provider the ability to quickly and accurately determine an advertisement type of a digital ad with a reduced number of human editors. The ability to quickly and accurately determine an advertisement type of a digital ad provides the ability to create more accurate reports for advertisers and the ability to more accurately optimize digital ads based on an advertising strategy of an advertiser.

It is therefore intended that the foregoing detailed description be regarded as illustrative rather than limiting, and that it be understood that it is the following claims, including all equivalents, that are intended to define the spirit and scope of this invention.

The invention claimed is:

1. A computer-implemented method for determining a type of a digital ad, the method comprising the steps of:
   automatically determining, with a processor, whether a digital ad is a direct response digital ad or a branding ad based on at least one of a number of hyperlinks associated with the digital ad, a number of click throughs associated with the digital ad, a click-through rate associated with the digital ad, and an industry associated with a digital ad; and
   exporting, with a processor, an indication of the determined type of the digital ad to a system of an online advertisement service provider.

2. The method of claim 1, wherein determining whether a digital ad is a direct response digital ad or a branding ad comprises:
   determining the digital ad is a direct response ad in response to determining a number of hyperlinks associated with the digital ad exceeds a hyperlink threshold.

3. The method of claim 1, wherein determining whether a digital ad is a direct response digital ad or a branding ad comprises:
   determining the digital ad is a branding ad in response to determining a number of hyperlinks associated with the digital ad does not exceed a hyperlink threshold and determining a number of click-throughs associated with the digital ad does not exceed a click threshold.

4. The method of claim 1, wherein determining whether a digital ad is a direct response digital ad or a branding ad comprises:
   determining the digital ad is a direct response ad in response to determining a number of hyperlinks associated with the digital ad does not exceed a hyperlink threshold, determining a number of click-throughs associated with the digital ad does not exceed a click threshold, and determining a click-through rate associated with the digital ad exceeds a click-through rate threshold.

5. The method of claim 4, wherein the click-through rate threshold is associated with an industry associated with the digital ad.

6. The method of claim 4, wherein the click-through rate threshold is associated with a plurality of industries associated with advertisers advertising with the online advertisement service provider.

7. The method of claim 1, wherein determining whether a digital ad is a direct response digital ad or a branding ad comprises:

determining the digital ad is a branding ad in response to determining a number of hyperlinks associated with the digital ad does not exceed a hyperlink threshold, determining a number of click-throughs associated with the digital ad does not exceed a click threshold, and determining a click-through rate associated with the digital ad does not exceed a click-through rate threshold.

8. The method of claim 7, wherein the click-through rate threshold is associated with an industry associated with the digital ad.

9. The method of claim 7, wherein the click-through rate threshold is associated with a plurality of industries associated with advertisers advertising with the online advertisement service provider.

10. The method of claim 1, further comprising:

adjusting at least a performance parameter associated with the digital ad based on the indication of the type of the digital ad.

11. The method of claim 1, wherein the indication of the determined type of the digital ad is exported to an advertisement campaign management system of the online advertisement service provider.

12. The method of claim 1, wherein the indication of the determined type of the digital ad is exported to an optimizer of the online advertisement service provider.

13. A computer-readable storage medium comprising a set of instructions for determining a type of a digital ad, the set of instructions to direct a processor to perform the acts of:

automatically determining whether a digital ad is a direct response digital ad or a branding ad based on at least one of a number of hyperlinks associated with the digital ad, a number of click throughs associated with the digital ad, a click-though rate associated with the digital ad, and an industry associated with the digital ad.

14. The computer-readable storage medium of claim 13, wherein automatically determining whether a digital ad is a direct response digital ad or a branding ad comprises:

determining whether a number of hyperlinks associated with the digital ad exceeds a hyperlink threshold.

15. The computer-readable storage medium of claim 13, wherein automatically determining whether a digital ad is a direct response digital ad or a branding ad comprises:

determining whether a number of click throughs associated with the digital ad exceeds a click threshold.

16. The computer-readable storage medium of claim 13, wherein automatically determining whether a digital ad is a direct response digital ad or a branding ad comprises:

determining whether a click-through rate associated with the digital ad exceeds a click-through rate threshold.

17. The computer-readable storage medium of claim 16, wherein the click-through rate threshold is associated with an industry associated with the digital ad.

18. The computer-readable storage medium of claim 16, wherein the click-through rate threshold is associated with a plurality of industries associated with advertisers advertising with the online advertisement service provider.

19. A system for determining a type of digital ad, comprising:

an ad type determination module comprising a computer-readable medium and a processor configured to execute instructions stored on the computer-readable medium, wherein the ad type determination module is operative to automatically determine whether a digital ad is a direct response ad or a branding ad based on at least one of a number of hyperlinks associated with the digital ad, a number of click throughs associated with the digital ad, a click-through rate associated with the digital ad, and an industry associated with the digital ad, and to export an indication of whether the digital ad is a direct response ad or a branding ad to a system of an online advertisement service provider.

20. The system of claim 19, further comprising:

an ad campaign management system in communication with the ad type determination module, the ad campaign management system operative to adjust at least one performance parameter associated with the digital ad based on the indication of whether the digital ad is a direct response ad or a branding ad.

21. The system of claim 19, further comprising:

an ad campaign management system in communication with the ad type determination module, the ad campaign management system operative to generate a report based on the indication of whether the digital ad is a direct response ad or a branding ad.

22. A computer-implemented method for determining a type of a digital ad, the method comprising the steps of:

automatically determining, with a processor, whether a digital ad is a direct response digital ad or a branding ad based on at least one of a number of hyperlinks associated with the digital ad, a number of click throughs associated with the digital ad, a performance metric associated with the digital ad, and an industry associated with the digital ad.

23. The method of claim 22, wherein the performance metric is one of a search lift associated with the digital ad, an acquisition rate associated with the digital ad, a purchase rate associated with the digital ad, or a click-through rate associated with the digital ad.

24. The method of claim 23, wherein the click-through rate associated with the digital ad is a maximum click-through rate associated with the digital ad after an ad provider has served the digital ad a determined number of times.

25. The method of claim 22, further comprising:

associating a predetermined number of impressions and a predetermined number of click-throughs with the digital ad when the digital ad is created.

* * * * *